(12) United States Patent
Havens

(10) Patent No.: US 6,257,157 B1
(45) Date of Patent: Jul. 10, 2001

(54) REFUSE INCINERATION PLANT AND EXHAUST GAS FILTRATION SYSTEM AND METHOD FOR USE THEREWITH

(75) Inventor: Randel L. Havens, Brandenburg, KY (US)

(73) Assignee: Synturian Enterprises, Inc., Shannon, IL (US)

( * ) Notice: Subject to any disclaimer, the term of this patent is extended or adjusted under 35 U.S.C. 154(b) by 0 days.

(21) Appl. No.: 09/420,868

(22) Filed: Oct. 19, 1999

(51) Int. Cl.$^7$ .............................. F23J 15/00; F23G 5/00
(52) U.S. Cl. ..................... 110/235; 110/255; 110/215; 110/216; 110/203; 110/342; 261/115; 432/148
(58) Field of Search ................. 110/215, 216, 110/119, 235, 255, 342, 346, 344, 233, 267, 203; 432/148, 152; 261/94, 95, 115; 60/670, 653

(56) References Cited

U.S. PATENT DOCUMENTS

| | | | |
|---|---|---|---|
| 2,127,645 | * | 8/1938 | Kinney et al. ............... 261/94 |
| 3,467,587 | | 9/1969 | Connell et al. .............. 202/173 |
| 3,859,933 | * | 1/1975 | Von Klenck ................ 110/8 R |
| 3,937,023 | | 2/1976 | Williamson .................. 60/670 |
| 3,965,362 | | 6/1976 | Harvey ....................... 290/1 R |
| 4,008,056 | * | 2/1977 | Potter ............................ 55/92 |
| 4,852,344 | | 8/1989 | Warner ...................... 60/39.182 |
| 4,873,840 | * | 10/1989 | Giliusson ................... 62/238.6 |
| 4,896,508 | | 1/1990 | Reinke, Jr. ................... 60/648 |
| 4,944,236 | * | 7/1990 | Sheen .......................... 110/257 |
| 4,970,969 | | 11/1990 | Koptis et al. ................ 110/190 |
| 5,127,344 | | 7/1992 | Katsui ......................... 110/255 |
| 5,308,385 | * | 5/1994 | Winn ............................. 95/195 |
| 5,412,465 | * | 5/1995 | Baylor et al. ................. 356/301 |
| 5,423,271 | * | 6/1995 | Schulze ....................... 110/237 |
| 5,634,412 | * | 6/1997 | Martin et al. .............. 110/101 CA |
| 5,675,970 | * | 10/1997 | Yamada et al. ............... 60/670 |
| 5,678,420 | | 10/1997 | Fukushima et al. ......... 62/238.6 |
| 5,802,993 | * | 9/1998 | Meador ........................ 110/345 |
| 6,006,682 | * | 12/1999 | Hung ........................... 110/255 |

\* cited by examiner

*Primary Examiner*—Denise L. Ferensic
*Assistant Examiner*—K. B. Rinehart
(74) *Attorney, Agent, or Firm*—Leydig, Voit & Mayer, Ltd.

(57) ABSTRACT

A refuse incineration plant is disclosed which utilizes a continuous rail system to transport refuse from a loading area into a burn core, from the burn core to an ash removal area, and back to the refuse loading area. Smoke and exhaust generated by the incineration process is sensed to control the incineration burn cycle, thereby allowing a variable burn cycle depending upon the composition of the refuse incinerated therein. Once sensed, the smoke and exhaust from the incineration process is exhausted into a filtration system having a main mixing tank and a number of filter condenser tanks coupled in series ascending/descending gaseous communication. The main mixing tank utilizes a series of baffle plates which aids in the mixing of the smoke/exhaust with water vapor as delivered within the main mixing tank by a series of water vapor spray jets. A cooling unit is also utilized to cool the mixture and aid in the condensation thereof. The series of filter condenser tanks utilize a condensation media to promote and enhance the condensation of the water vapor/exhaust mixture. Once condensed, the liquid mixture is delivered to a vaporizer unit which vaporizes the water out of the mixture for reuse in the mixing and filter condenser tanks. The vaporizer also collects the particulate matter as a residue on the vaporizer plates which may be periodically cleaned for proper disposal or reuse. A secondary filter condenser tank is preferably used, as is a final testing and filter tank.

13 Claims, 5 Drawing Sheets

REFUSE INCINERATION PLANT AND EXHAUST GAS FILTRATION SYSTEM AND METHOD FOR USE THEREWITH

FIELD OF THE INVENTION

The instant invention relates to a refuse incineration plant, and more particularly to incineration exhaust gas filtration systems for use therewith.

BACKGROUND OF THE INVENTION

Consumer and industrial refuse generation has reached an unprecedented level in the United States. Consumer consumption on the individual and family level combined with an increased amount of product packaging has raised the individual refuse generation volume to one of the highest levels in recorded history. To meet an increased consumer demand for products, industry has also increased their production which carries with it, as a natural by-product, increased refuse generation at the manufacturer level as well.

At the same time that the refuse output of the population is increasing, the available space in current and proposed landfills is rapidly decreasing due to increased consumer demand for land and the volume of refuse placed in current fills. As a result, much research and development activity has concentrated in the area of refuse management, and in particular on refuse incineration. Out of this research and development, various incineration systems have been patented, including those depicted in U.S. Pat. Nos. 3,467,587, 3,937,023, 3,965,362, 4,852,344, 4,896,508, 4,970,969, 5,127,344, and 5,678,420. While many of these systems are able to alleviate the pressing problem resulting from the increased refuse generation, most are primarily concerned with aspects of the incineration process to maximize the electric power generated from the heat produced during the incineration of the refuse. While energy production and utilization is an important by-product benefit of refuse incineration, many of these systems overlook the environmental impact caused by the smoke and exhaust resulting from the incineration of refuse as fuel for power generation. To prevent much of this impact, many of the refuse incineration plants currently in operation require that the various types of refuse be separated to remove many types of materials prior to the incineration of the refuse. This significantly increases the cost of refuse incineration, and tends to dissuade further investment in this technology.

The requirement for the separation of this refuse stems from output emissions requirements and incinerator performance. Specifically, the output emissions filtration systems which are currently available and economically feasible simply cannot provide the required amount of filtration at an acceptable cost to allow the incineration of multiple types of refuse in a single incinerator. There exists therefore a need and a desire for an incineration plant which is capable of incinerating unsorted refuse while still meeting and exceeding the Environmental Protection Agency's requirements on clean air standards for emissions.

SUMMARY OF THE INVENTION

In view of the above problems existing in the art, it is an object of the instant invention to provide a new and improved refuse incineration plant, and more specifically a new and improved refuse incineration plant utilizing a filtration system which economically meets and exceeds the EPA's emissions requirements for refuse incineration plants. It is a further object of the instant invention to provide a refuse incineration plant which is capable of incinerating unsorted refuse, thus greatly reducing the overall costs of such incineration. It is a further object of the instant invention to provide a refuse incineration plant which utilizes the heat generated from the incineration process to produce electrical energy for distribution to the power grid. It is an additional object of the instant invention to provide a refuse incineration plant that produces as a by product of the incineration process a material which may be used instead of simply discarded.

In view of these and other objects, it is a feature of the instant invention to provide an incineration plant utilizing a series of filtration towers which filter the incineration exhaust so as to release essentially no pollutants into the atmosphere. It is a further feature of the instant invention that the filtration towers utilize a porous fill material to increase the surface area within the filtration tanks to improve the efficiency thereof. It is a further feature of the instant invention that the filtration towers utilize spray water mist to aid in the filtration process. Further, it is a feature of the instant invention to utilize vaporizing and collection plates for reducing the volume of water required for the filtration system and for collecting the precipitant material removed from the incineration exhaust by the filtration system.

Additionally, it is a feature of the instant invention to provide a post-incineration ash treatment subsystem. It is a further feature that this ash subsystem separate various materials from the residual ash for recycling. It is also a feature of the instant invention to provide treatment of the sorted ash to produce a valuable by product whose properties may be modified during the treatment process.

In view of these objects and features of the instant invention, a preferred embodiment of the incineration plant comprises a plurality of incineration tray tracks which accommodate the refuse loading, inserting, and extracting from the incineration chamber, and ash removal from burn trays which hold the refuse to be incinerated. Multiple trays may be utilized on a single track, with individual trays being located at various functional locations thereon. Preferably, the plant of the instant invention includes multiple incineration cores into which the refuse loaded trays are positioned for incineration of the refuse contained therein. The trays themselves are made of a high-strength, heat resistant material capable of withstanding the refuse incineration process. Preferably, the burn core includes a door on either end to accommodate the insertion of a refuse tray on one side and allowing for the extraction thereof from the other. Once a refuse loaded tray has been positioned within the burn core, air rams engage, forcing air in from both ends of the burn core to aid in the incineration process over top fuel assist. The heat energy generated within the burn core is used in a fairly conventional steam driven turbine power plant to generate electricity.

Once the refuse has been fully incinerated, the tray is extracted from the opposite end of the burn core where it travels around the track to an ash removal bay. The ash removed from the trays is then sorted or sifted to remove recyclable material such as glass, etc. The non-recyclable ash is stored pending treatment to produce a usable by product. This by product is strong and waterproof and may be utilized as a construction material which will not conduct electricity. This treatment process may be controlled to produce a flexible or hard byproduct for use in a variety of products including trays, shingles, tiles, countertops, etc.

The output exhaust from the incineration process is preferably exhausted into a main mixing tank. Preferably, this main mixing tank includes a secondary fume ignitor to burn off any volatile gases and enhance the safety of the overall system. In a preferred embodiment, the main mixing tank includes a plurality of baffle plates and water vapor spray jets to begin the initial precipitation of the exhaust pollutants. The exhaust preferably enters the bottom of the main mixing tank and provides an exhaust flow path upward through the mixing tank to the top thereof. This main mixing tank provides an outlet conduit at the top thereof leading to a first filter condensation tank which provides a downward exhaust flow path through a porous material. Preferably, lava rock is utilized in the filter condenser tanks because of its enhanced surface area due to its porous nature and because it is lightweight and capable of withstanding high temperatures. This first filter condenser tank is preferably coupled through a conduit to another filter condenser tank which provides an upward exhaust flow path, also through a porous material. Preferably, this upward and downward flowing configuration is repeated a number of times, depending upon the volume of exhaust needed to be filtered based on the size of the incineration plant and the type of refuse incinerated. The water vapor which condenses in the filter condenser tanks will be taken by return lines to vaporizing units which will vaporize the water and collect the particulate material on the vaporizing plates therein. This material may be cleaned from the vaporizing plates at various intervals as required. The condensation of the exhaust/vapor mixture is also aided by the periodic placement of refrigeration coolers distributed throughout the exhaust filtration system.

This having been described, a preferred embodiment of a refuse incineration plant in accordance with the teachings of the instant invention comprises at least one burn core having a fore and an aft door at either end of the burn core, which burn core is suitable for incineration of refuse. Further, a preferred refuse incineration plant includes a rail system providing a track through the burn core and connecting the burn core with a refuse loading area and an ash removal area within the plant. At least one burn tray is movably positioned on the rail system, and is adapted to carry refuse from the refuse loading area, through the burn core, and to the ash removal area on the rail system. The preferred embodiment of the refuse incineration plant also includes an incineration exhaust filtration system having a main mixing tank and a plurality of filter condenser tanks in serial ascending/descending gaseous communication. In a highly preferred embodiment, the rail system provides a continuous path from the refuse loading area, through the burn core, through the ash removal area, and back to the refuse loading area.

The plant of the instant invention may further provide an incineration exhaust sensor positioned to sense exhaust resulting from operation of the burn core and providing an output to the burn cycle controller. Preferably, the burn cycle controller varies a period of operation of the burn core based on the input from the exhaust sensor. This exhaust sensor is preferably a light wave type sensor providing an output signal indicative of the amount of particulate matter in the exhaust. Further, the burn cycle controller preferably continues operation of the burn core until the output signal drops to a preset level corresponding to essentially complete incineration of the refuse within the burn core.

In a highly preferred embodiment, both the fore and aft doors include air rams providing increased airflow into the burn core to enhance its operation. In a highly preferred embodiment having at least two burn cores and a steam turbine electrical power generation subsystem having its main steam tank positioned in thermal association with the at least two burn cores, the burn cycle controller ensures that a burn cycle in one of the at least two burn cores is not begun and ended simultaneously with a burn cycle in another of the burn cores.

In a further preferred embodiment of the instant invention, the system further comprises a cooling unit. In this preferred embodiment, the main mixing tank comprises a vertical housing having an incineration exhaust entry port and a cold air entry port near a bottom thereof, and an incineration exhaust exit port at the top thereof. The incineration exhaust entry port is preferably in gaseous communication with the burn core and the cold air entry port is in gaseous communication with the cooling unit. The main mixing tank further comprises baffle plates positioned within the vertical housing along its height and water vapor spray jets positioned around the inner periphery of the vertical housing. Preferably, the filter condenser tanks comprise a vertical housing having a first exhaust port at a top thereof and a second exhaust port near a bottom thereof. The filter condenser tanks further comprise condensation and filtration media disposed within the vertical housing to a point forming a manifold area between an uppermost surface of the media and a bottom surface of the top of the vertical housing. Also preferably, the condensation and filtration media comprises lava rock. In a highly preferred embodiment, the plant further comprises a water vaporization system, including at least one vaporizer, a first fluid communication output circuit coupled between the vaporizer and the plurality of water vapor spray jets in the main mixing tank, and a second fluid communication input circuit coupled between the main mixing tank and the filter condenser tanks to the vaporizer. Preferably, the vaporizer vaporizes fluid delivered to it from the main mixing tank and the filter condenser tanks, collecting residue thereon from the main mixing tank and the filter condenser tanks for later removal and disposal.

Further in accordance with the teachings of the instant invention in an incineration plant adapted to incinerate refuse, the incineration plant including at least one burn core in which refuse is incinerated thereby generating smoke and exhaust, an incineration exhaust filtration system comprises a vertical mixing tank having an exhaust inlet port near a bottom thereof for receiving smoke and exhaust from the incineration plant. The vertical mixing tank further includes an exhaust outlet port at a top thereof. Baffle plates are axially displaced one from another within the mixing tank, and water vapor spray jets arc disposed around an inner periphery of the main mixing tank. The system further comprises vertical filter condensation tanks coupled to the exhaust outlet port of the mixing tank in series descending/ascending gaseous communication thereby forming an exhaust path of alternating descending and ascending gaseous flow through the adjacent, series-coupled filter condenser tanks. Preferably, the system further comprises a cooling unit in gaseous communication with the mixing tank to supply cold air to be mixed with the smoke and exhaust from the incineration plant within the mixing tank. Additionally, a preferred embodiment also includes at least one cooling unit in gaseous communication within the exhaust path of the filter condenser tanks cooling and aiding the condensation of the descending and ascending gaseous flow therethrough.

In a highly preferred embodiment, the filter condenser tanks include a condensation media disposed therein. Preferably, the filter condenser tanks form a manifold between an inner top surface of the filter condenser tanks and an upper surface of the condensation media. Within this manifold, a preferred embodiment includes cleaning solution spray jets disposed around an inner periphery forming an acid ring. Further, the mixing tank and filter condenser tanks preferably include a condensed fluid drainage port in liquid communication to at least one vaporizer which provides water to the water vapor spray jets. Specifically, the vaporizer vaporizes water out of the condensed fluid thereby collecting residue therefrom. This residue is preferably periodically removed from the vaporizer. In a highly preferred embodiment of the instant invention the system further comprises a secondary vertical filter condenser tank in series descending gaseous communication with the filter condenser tanks, and a vertical filter and testing tank in series ascending gaseous communication with said secondary filter condenser tank.

In accordance with the teachings of the instant invention, a preferred method of filtering exhaust from a refuse incineration plant comprises the steps of mixing the exhaust with water vapor, promoting condensation of the mixed exhaust/water vapor, recovering the condensed exhaust/water vapor, vaporizing water from the recovered condensed exhaust/water vapor, and removing residue remaining from the step of vaporizing. In a highly preferred method, the step of promoting condensation comprises the steps of providing a series ascending/descending gaseous flow path, providing a high surface area condensation media within the series ascending/descending gaseous flow path, and reducing the temperature of the mixed exhaust/water vapor. Preferably, the step of mixing the exhaust with water vapor comprises the step of spraying water vapor into the ascending gaseous flow path at distributed points therealong within the main mixing tank. In a particular embodiment of the instant invention, the step of mixing the exhaust with water vapor comprises the step of flowing the exhaust through a gaseous flow path including baffle plates placed therein, and spraying water vapor in the gaseous flow path.

These and other objects and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
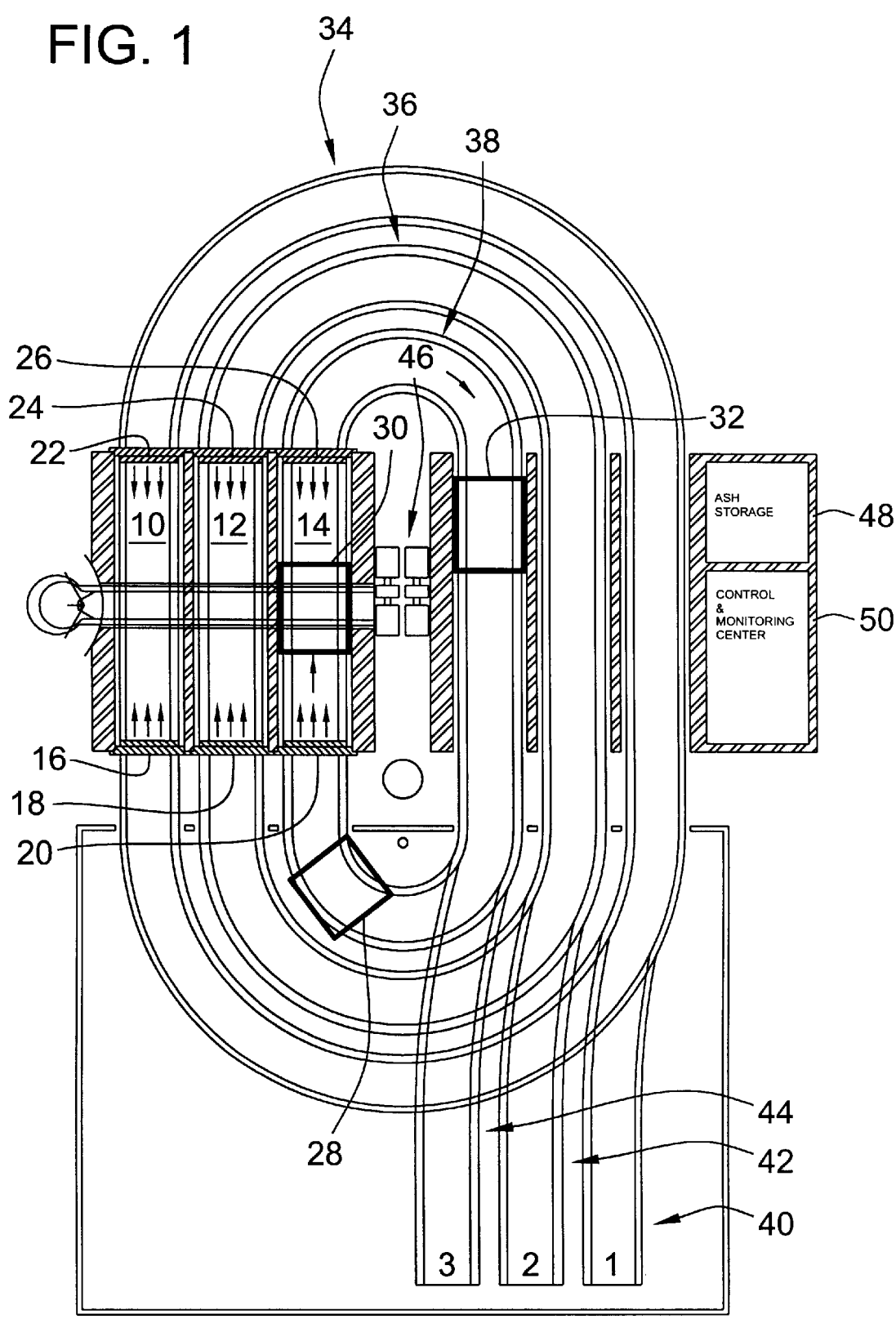
FIG. 1 is a simplified overhead layout view of an incineration plant constructed in accordance with the teachings of the instant invention.

In a preferred embodiment of the instant invention, a refuse incineration plant includes three (3) burn cores, 10, 12, 14 in which the refuse is incinerated. Uniquely, these individual burn cores 10, 12, 14 each include a fore 16, 18, 20 and aft 22, 24, 26 door. These doors facilitate the insertion (through doors 16, 18, 20) and extraction (through doors 22, 24, 26) of the refuse to be incinerated into and out of the burn core 10, 12, 14 in a manner to increase the efficiency of the incineration plant. Specifically, a refuse incineration burn tray 28 may be loaded with refuse to be incinerated while another burn tray 30 is in the incineration burn core 14, while a third burn tray 32 is having the residual ash removed therefrom. The multistage operation of this configuration is facilitated through the use of burn tray rails 34, 36, 38 on which the burn trays are transported through the various stages of operation of the incineration plant of the instant invention. Specifically, for each burn core in the particular incineration facility (three of which are shown in FIG. 1 for purposes of illustration) a rail system is utilized to transport the burn trays through the various stages of the incineration process. While the illustration in FIG. 1 represents an oval configuration, the particular plant layout design may dictate a different configuration, but will preferably utilize a continuous rail system to maximize system efficiency. As illustrated in FIG. 1, it is also contemplated that the rail system may also include various spur rails 40, 42, 44 to allow for burn tray replacement, loading, unloading, or other operations which may take a period of time which would otherwise disrupt the continuous rail circuit 34, 36, 38 of the instant invention.

While three (3) rail circuits 34, 36, 38 have been illustrated in association with three (3) burn cores 10, 12, 14, one skilled in the art will recognize that the particular number of burn cores and corresponding rail circuits for the transportation of the refuse burn trays may vary without departing from the scope and spirit of the instant invention. Further, as each of the individual burn core/circuit rail subsystems is nearly identical in configuration, the following description will describe only the operation of a single burn core for purposes of simplicity where appropriate. The multicore embodiment will be described when such description is necessary for understanding the interaction between multiple burn cores and other aspects of the system. However, it is noted that such channel specific discussion is meant for purposes of illustration only and is not set forth for purposes of limiting the scope of the invention to the particular embodiment illustrated and described.

As may be appreciated from FIG. 1, during operation of the incineration system of the instant invention, a burn tray 28 is loaded with refuse in a refuse loading area through which the rail track circuit 38 passes. Once loaded, the burn tray is transported along rails 38 to its associated burn core 14. The burn tray is admitted to the burn core through fore door 20. Once within the burn core 14 (see burn tray 30), fore door 20 is again closed and the incineration process is begun. During the incineration process, which may be of a conventional nature, air rams engage from both the fore 20 and aft 26 door to both assist in the incineration process and to prevent leakage of exhaust therethrough. A top fuel assist may be utilized to aid in the incineration process as is conventional and known in the art. The particular temperature achieved in the burn core 15 may be variable based upon the type of refuse being incinerated, and may be between 800° and 1,400° Fahrenheit, depending on system incineration requirements. In addition to the variation in incineration temperature, the particular cycle time that any particular burn tray is in the burn core may also be variable. Through the use of an exhaust sensor (described more fully below) the incineration process within the burn core 14 continues until the exhaust sensor determines that the incineration process is complete. This allows for optimized efficiency in the incineration system as burn trays of different refuse composition are within the burn core for no longer than is appropriate to fully incinerate that particular composition of refuse.

Once the incineration process has been determined to be complete, the aft door 26 is opened and the burn tray is transported along tracks 38 to an ash removal area (see burn tray 32). Once the burn tray has been removed from the burn core 14, the aft door 26 is closed and the fore door 20 is opened to accommodate the insertion of a newly loaded burn tray therethrough. This removal and insertion process may be sequential as described above, or may be simultaneous as desired. In a system utilizing a small number of burn cores, the sequence is preferably sequential to maximize the heat retention within the burn core. However, in a multiple burn core system, a simultaneous sequence of removal and insertion may be undertaken for the individual burn cores, since other burn cores are likely to be in the incineration process at the time any one burn core has completed its incineration process and is engaging in an extraction/insertion operation. In this way, in a multiple burn core system, the heat from the burn cores which are operating in their incineration process may provide the necessary heat to a conventional steam driven turbine electrical generation subsystem 46 to maintain full output as will be described more fully below. Further, even in a single burn core installation, the speed at which the spent tray may be extracted and a newly loaded tray may be inserted is such to allow continuous operation of the steam driven turbine electrical energy generation subsystem 46.

Once having exited the burn core 14, the burn tray travels along its particular rail 38 to an ash removal area (see burn tray 32). in this ash removal area, the remaining ash and other residue in the burn tray is removed therefrom to allow the burn tray to continue along its track 38 so that it may be reloaded with refuse for another cycle of the operation. The removal of the ash may be accomplished in any number of conventional methods, and preferably as accomplished through the use of a wiper arm mechanism (not shown) which scrapes the incinerated refuse ash from the burn tray into ash removal bays located below the track 38. This ash removal is accomplished with the burn trays illustrated in FIG. 3 by first removing cage 90 from the burn tray frame 92 so that a sweeper arm may reach the ash which has fallen through the bottom of cage 90 into the burn tray frame 92. Any large items remaining on cage 90 may be removed therefrom for further processing, or may be allowed to remain in cage 90 for reincineration. Once the ash and other residual material has been removed from the burn tray 32, it is transported by conveyer or other known mechanism to an ash sifting and sorting area where the ash is sifted through at least one, and preferably a number of filter screens. Also in this area material such as glass and metals may be removed from the ash. These materials may then be transported to an appropriate recycling center for reuse. The separated ash is stored in an ash storage facility 48 which may contain several storage compartments for individual storage of different particulate size residual ash. From this ash storage area 48, the refuse ash may be extracted for use in a post-incineration process to form a useful byproduct as will be described more fully below. The entire incineration process is controlled and monitored from a control and monitoring center 50 including a burn cycle controller which monitors the incineration process and controls operation thereof.

Once the incinerated refuse ash has been moved to storage area 48, it may be utilized on site or exported to an external facility where it may be employed in the formation of a useful byproduct. Specifically, the incinerated ash may be mixed with a bonding compound to produce a strong, water-proof construction material which is, in a preferred embodiment, electrically insulated and non-toxic. This product can be made flexible or hard and may be used to produce a variety of products including flatware, trays, shingles, tiles, cups, counter tops, etc. In a preferred embodiment, the bonding material utilized is Castolite™ AC manufactured by Castolight, Inc. of Woodstock, Illinois. By using a preferred combination of ninety percent (90%) ash, ten percent (10%) Castolite AC, a suitable construction material may be formed. The ratio of ash to Castolight may be varied significantly, depending on the texture and properties of the resultant material.

Specifically, the resultant material may be made relatively rigid or flexible by controlling the amount of Castolite AC utilized in the process. Specifically, reducing the amount of Castolite AC utilized in the mixture will allow the material to be more flexible for uses such as roof shingles, non-slip floor tile, etc. On the other end of the spectrum, an increase in the amount of Castolite AC utilized in the mixture will result in a much harder resultant material. For example, a combination of sixty percent (60%) ash and forty percent (40%) Castolite AC will result in a jet smooth finish that may be poured over other materials as a coating material. Once dried, it is very hard and resistant to burning or other marring. As this use indicates, the resultant material may be of liquid or solid form and may be provided as a surface coating or a construction material itself, simply through the variation of the amount of bonding material utilized in the process.

To form sheets of the resultant material for use as countertops, etc., the ash/Castolite AC mixture may be poured into a mold and allowed to harden over a period of twelve to twenty-four hours, depending on the thickness of the sheet desired. In a preferred embodiment of the instant invention, no heat cure cycle is required, although such may aid in the drying process as would be recognized by one skilled in the art. Certain other uses may require time cured cycles to allow for proper out gassing, depending on the particular use to which the resultant material may be placed, and the environment in which it will be used. Alternatively, the mixture may be utilized as a coating material to coat particle board or other sheets as desired. Multiple coats may be applied after appropriate drying time as desired.

Figure 2:
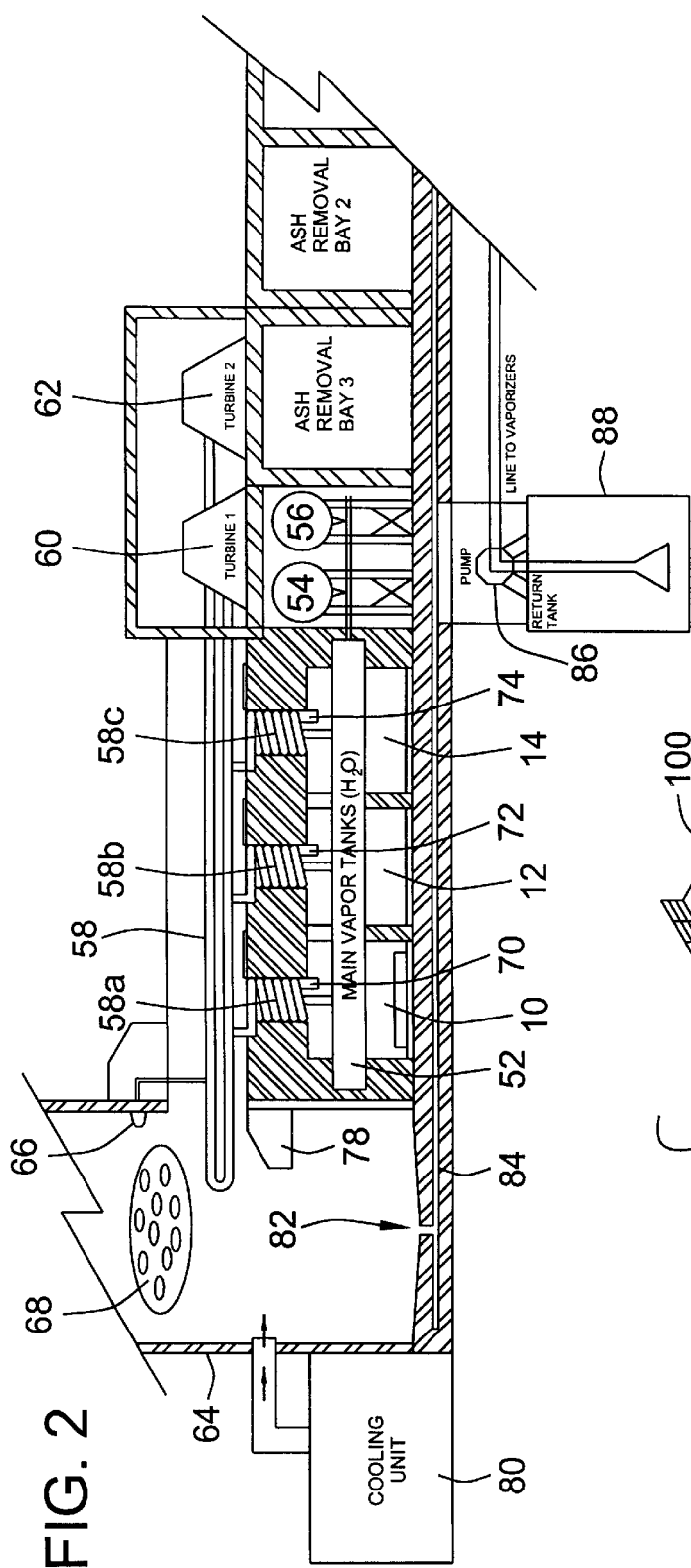
FIG. 2 is a partial cross-sectional view of an incineration plant and filtration system constructed in accordance with the teachings of the instant invention.

Returning now to the incineration plant of the instant invention, and specifically to FIG. 2, we see that a main vapor tank 52 of the electric power generation subsystem 46 is positioned over the individual burn cores 10, 12, 14. Water is supplied to the main vapor tank from an external source of water, preferably from storage tanks 54, 56. Once in the main vapor tank 52, the water is boiled by the heat emanating from the burn cores 10, 12, 14. The resulting steam is transferred through steam conduit 58 to drive the steam turbines 60, 62 which in turn drive multiple electric power generators (see FIG. 1) to produce electric power. This electric power may be utilized by the incineration plant, and the excess may be sold to the utility grid for distribution to homes and businesses. The steam conduit includes coils 58*a*, 58*b*, 58*c*, which are positioned in the burn core exhaust flow path to maximize heating of the steam to optimize the power extracted therefrom. A portion of this super heated steam is also diverted to a main mixing tank 64 into which the incineration exhaust flows. This steam is injected into the main mixing tank through water vapor spray jets 66 located around an inner periphery of the main mixing tank 64 in proximity to baffle plates 68 located therein.

In addition to the steam coils 58a–c being located in the exhaust path of the burn cores 10, 12, 14, exhaust sensing detectors are also placed within the exhaust flow path to determine when the incineration process is complete for each individual burn core. The sensors 70, 72, 74 may be of conventional light wave type construction for sensing the amount of smoke and other particulate matter contained in the incineration exhaust. Alternatively, a single exhaust sensor could be placed near the point at which the combined exhaust from each of the individual burn cores enters the main mixing tank 64, although such would not allow individual burn cycle determination for the individual burn cores. The output from these sensors 70, 72, 74 may be utilized by the control monitoring center 50 (see FIG. 1) to determine when it is appropriate to remove a particular burn tray from a burn core and replace it with a new burn tray loaded with refuse. The output from the sensor may be a discrete signal which is utilized by an automated control to advance the process, or may utilize an output which indicates the amount of particulate matter in the exhaust which may signal incineration cycle completeness at a given level. Other more complex sensors may be utilized in the exhaust output to control incineration perimeters, such as temperature, ram air, volume, fuel assist level, etc.

Once the incineration exhaust enters the main mixing tank 64, a secondary flame ignitor 78 burns off any volatile gases which may exist after the main incineration process in the burn core. This secondary fume ignitor 78 is of conventional construction and is utilized primarily as a safety measure against the accumulation of flammable or other volatile gases. Once in the main mixing tank at 64, the incineration exhaust is mixed initially with cold air from a cooling unit 80. This cold air reduces the temperature of the exhaust from the incineration burn cores and aids in the condensation of particulate matter from the exhaust as is a feature of the invention. Specifically, within the main mixing tank, a series of baffle plates 68 are utilized to enhance the mixing of water vapor sprayed into the main mixing tank at 64 through a series of water vapor jets at 66 located throughout the main mixing tank 64 about its inner periphery. The baffle plates 68 are preferably positioned every 5–10 feet up the tank 64, so that approximately at least 4 or 5 baffle plates 68 are used to aid in the mixing.

As the particulate matter from the exhaust gas mixes with the water vapor, condenses, and precipitates out of the vapor, it flows through a collection port 82 in the bottom of the main mixing tank 64 through a channel or conduit 84 to a collection area return tank 88. A pump 86 takes the precipitated liquid mixture and delivers it to vaporizers (see FIG. 4). The vaporizers vaporize the water and recycles it to the main mixing tank 64 to be again mixed with the exhaust as described above and collects the precipitated residue thereon. Periodically, the residue is removed from the vaporizer plates, preferably by scraping to remove the build-up of particulate matter. This matter may then be disposed of or mixed with the ash from the incineration process for further processing as described above. Further description of the vaporization and cleaning process is included below.

Figure 3:
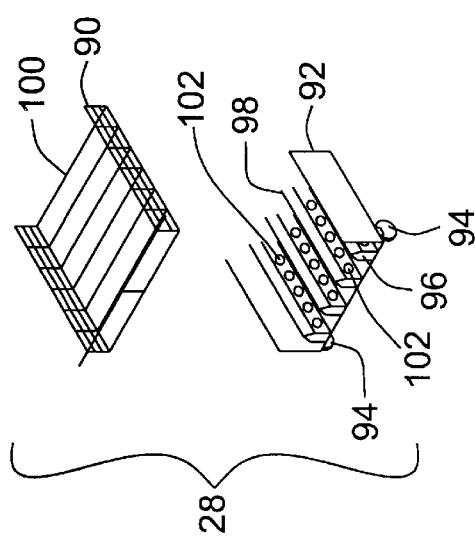
FIG. 3 is a simplified exploded isometric view of a burn tray suitable for use with the refuse incineration plant of the instant invention.

The burn trays utilized in the system of the instant invention are made of high strength heat resistant material, and may be constructed as illustrated in FIG. 3. The burn tray 28 includes an inner refuse cage 90 which is suitable to hold the refuse in place while allowing flame and heat flow through the bottom grid of cage 90 to aid in the incineration of the refuse held therein. The refuse cage 90 fits within a solid burn tray frame 92. This frame 92 includes wheels 94 mounted thereon for engagement with the rail tracks (see FIG. 1) to allow transportation of the burn tray through the incineration system of the instant invention. Situated within the bottom of frame 92 are a plurality of burner assemblies 96 to aid in the incineration process. The burner assemblies 96 are configured along a length of frame 92 such that an upper surface 98 thereof cooperates with cross-bars 100 of cage 90 to form a lower grid pattern which is suitable for holding the refuse in place during the incineration process. The burner structures 96 also include a plurality of flame ports 102 which cooperate with a fuel assist to aid in the incineration of the refuse contained in the burn tray 28 The flame ports 102 are preferably at least 4 inches from the bottom of frame 92. This positioning may vary so long as the parts 102 do not become blocked by incinerated refuse ash which fills to the bottom of frame 92 during the incineration process.

Figure 4:
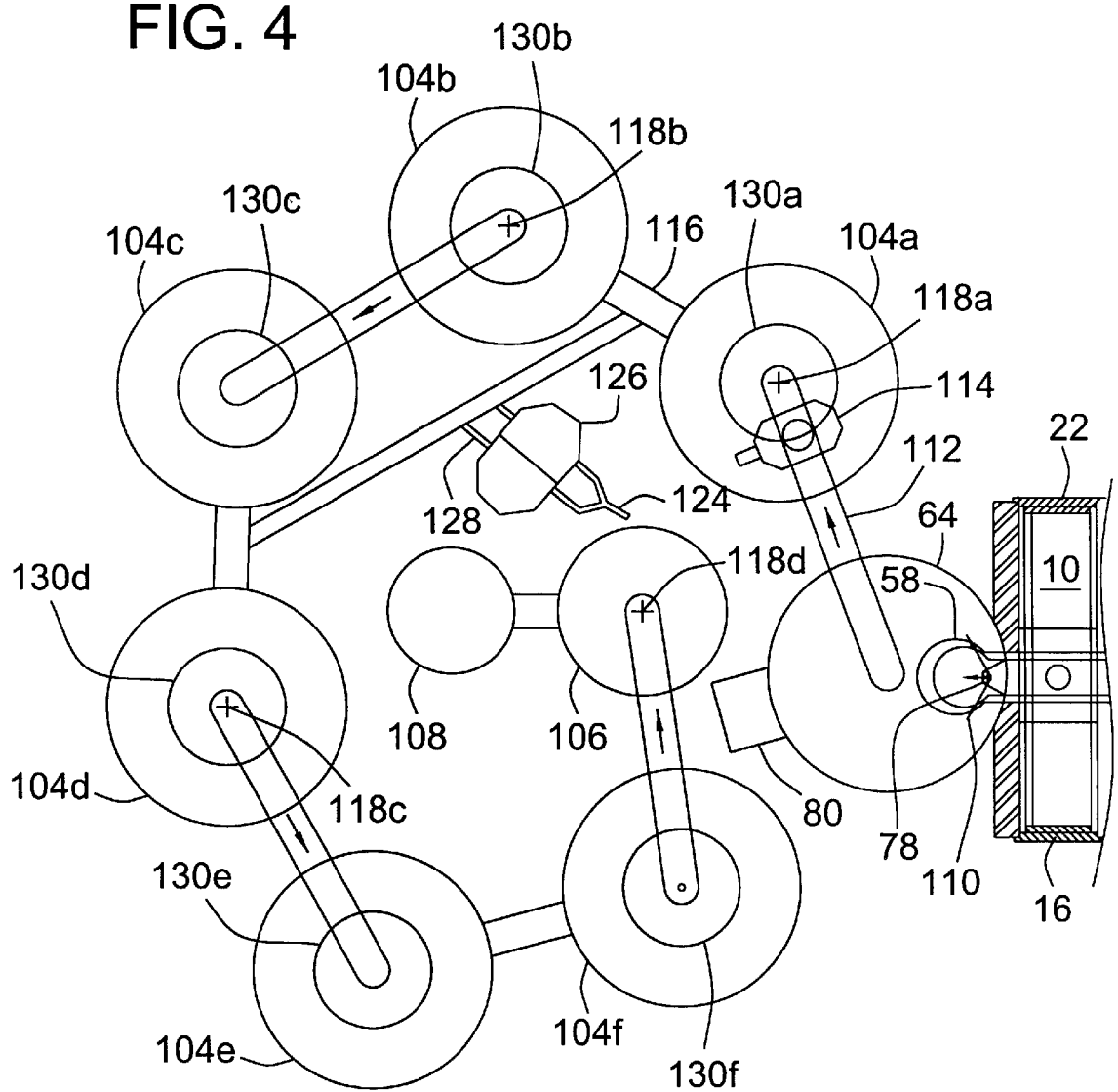
FIG. 4 is a simplified schematic layout diagram of the refuse incineration exhaust filtration system of the instant invention.

Having now described the incineration process and the utilization of the incineration byproduct, we now turn to the filtration of the exhaust gas which minimizes or eliminates the release of any smoke or other pollutants into the air. The filtration system as illustrated in FIG. 4 is optimally suited for the incineration system as described above, but one skilled in the art will recognize that this filtration system may also be utilized to improve the output emissions of other incineration plants. Further, by utilizing such a filtration system the incineration plants may broaden the category of refuse which may be incinerated therein due to the efficiency of the filtration system in removing smoke and other pollutants from the output emission of the incineration plant itself. Specifically, the filtration system includes a main mixing tank 64 and a series of filter condenser tanks 104A–F, at least one secondary filter condenser tank 106, and a final filter and testing tank 108. The system of filtration operates on a precipitation theory of filtration whereby the smoke and exhaust from the incineration process are mixed within the main mixing tank 64 with water vapor and allowed to condense into precipitation throughout the filtration tanks 104A–F, thereby removing the smoke and other particulate matter from the exhaust before venting to the atmosphere. The precipitation process is aided within the filtration tanks 104A–F by the inclusion of material having a large surface area which promotes condensation thereon.

The filtration process begins in the main mixing tank 64 as the exhaust represented by arrows 110 enters the main mixing tank 64 from the burn core 10 over a secondary fume ignitor 78. As described briefly above, the secondary fume ignitor 78 reduces the potential for volatile fume build-up within the filtration tanks as a result of the incineration process. Once in the main mixing tank 64, the smoke and exhaust 10 from the incineration process is mixed with super cold air from a cooling unit 80. This super cooled air is rammed into the main mixing tank 64 to mix with the hot smoke and exhaust from the incineration process to cool this gaseous mixture and promote condensation of the particulate matter contained therein. Once in the main mixing tank 64, the incineration exhaust is drawn up through the main mixing tank. While the gaseous material is flowing up through the main mixing tank, it is encountering a plurality of baffle plates (see element 68, FIG. 2) which aids in the mixing of the gaseous material with the water vapor supplied through a series of water vapor jets contained therein. Preferably, the baffle plates are spaced about every 6 feet.

The gaseous exhaust which is not condensed and precipitated out in the main mixing tank 64 travels through a conduit 112 to the first of the series of main filtration tanks 104A–F A cooling coil 118A is positioned within this conduit 112 at the top of filtration tank 104A to further cool the mixture and aid condensation in this tank 104A. Similar cooling coils 118B–D are positioned throughout the system as illustrated. The exhaust flows down through the first main filtration tank 104A, aided by vacuum fan 114. The interior of the main filtration tanks is filled with a highly porous material or other material having a large surface area to aid in the condensation and precipitation of the smoke and particulate matter contained in the incineration exhaust. Preferably, lava rock is utilized within the main filtration tanks 10A–F as such contains a very large surface area, is able to withstand high temperature conditions, and significantly enhances the condensation and precipitation of the water vapor/exhaust mixture. Another preferred material is glass beads having a large surface area.

Having downwardly traversed the first filtration tank 104A, the exhaust which has not been mixed with water vapor and condensed out of the system travels through conduit 116 into the second main mixing tank 104B where it flows upward therethrough. The construction of the main filtration tanks 104A–F are nearly identical; however, the placement of the vacuum fans to aid in the downward, upward, downward, upward flow path of the exhaust obviously varies between the bottom and the top of the filtration tanks as appropriate to aid in this flow path. Further, while the particular size of the individual tanks in the filtration system may vary based upon system requirements, a preferred embodiment of the instant invention utilizes thirty (30) foot diameter mixing and main filtration tanks having a height of eighty (80) feet. Preferably, these tanks are glass fused. While a particular installation may require specially manufactured filtration tanks, a preferred embodiment of the instant invention utilizes a Harvester™ silo manufactured by Smith Corporation of Janesville, Wisconsin. The exhaust transfer conduits 112, 116, etc. preferably have a diameter of five feet. The secondary filter condenser tank 106 preferably has a diameter of twenty-two (22) feet and a height of eighty (80) feet. The final filter and testing tank may preferably have a diameter of sixteen (16) feet and a height of only sixty (60) feet. However, one skilled in the art will recognize that the particular diameter and heights of the filtration and testing tanks may be varied based upon system requirements in innumerable fashion without departing from the spirit and scope of the instant invention. Therefore, the applicant presents these preferred construction parameters by way of illustration only and not by way of limitation. Further, the number of filtration tanks utilized may also vary based on system requirements.

The secondary filter condenser tank 106 need not be as large as the prior main filtration tanks 104A–F based upon the amount of condensation and precipitation which has occurred in these prior filtration tanks. As with the main filtration tanks, however, the secondary filtration tank 106 includes a cooling coil 118D to further reduce the temperature and enhance and promote additional condensation and precipitation of the water vapor/exhaust mixture flowing therethrough. The final filter and testing tank 108 in the filtration system also need not be as large as the primary filtration tanks 104A–F in the system. Preferably, by the time the exhaust reaches the filter and testing tank 108 and is exhausted into the atmosphere, the temperature is fairly low. Preferably, the temperature may be in the range of approximately thirty-two (32) to forty (40) degrees upon exhausting, and at times may below freezing. This filter and testing tank 108 also includes a plurality of exhaust sensors therein for performing required tests on a continual basis to ensure that the system is not exhausting pollutants into the atmosphere. Other types of filters may be used in this tank as appropriate.

As may be apparent from the foregoing description, the main mixing tank utilizes a tremendous amount of water vapor to mix with the smoke and exhaust from the incineration process. Further, it may be apparent that the smoke and exhaust from the incineration process mixes with the water vapor in the main mixing tank, condenses in the main filtration tanks, and precipitates to the bottom of these tanks as a liquid mixture. The system of the instant invention handles this liquid mixture in a manner to prevent the release of pollutants contained therein into the environment. Specifically, the system of the instant invention utilizes an essentially closed liquid circuit for handling the vaporization, collection, and purification of the water utilized in the filtration system. Each of the filtration tanks includes a port to a water return conduit 128 which leads to a vaporizing unit 126 which vaporizes the water and delivers it to the various water vapor spray jets utilized in the main mixing tank.The specifics of the water vapor collection and distribution are not illustrated in FIG.4 for purposes of simplicity. However, one skilled in the art will recognize that once vaporized, the water vapor may be delivered via conduit 124 to the water vapor spray jets in the main mixing tank.

As the water vapor mixes with the smoke and exhaust from the incineration process within the main mixing tank and then condenses and precipitates to the bottom of this and the filtration tanks, the liquid mixture of smoke and exhaust and water returns to the vaporizer units 126. Within these vaporizer units 126, the water is vaporized and the particulate matter resulting from the mixing, condensation, and precipitation with the incineration exhaust smoke and gases collects on the vaporizer plates. This residue which collects on the plates is periodically removed or scraped therefrom and taken to a collection area where it may be mixed with the ash from the incineration process, or may be otherwise disposed of as is appropriate. In this way, the exhaust from the incineration process is first mixed with water vapor, condensed into a liquid mixture, and then removed from the liquid mixture by vaporizing the water from the mixture leaving the solid residue to be disposed During operation of the filtration system, incineration exhaust residue will be collected on the filtration media within the main filtration tanks 104A–F to some degree. After a period of time, it may be desired to clean the filtration media within the filtration tanks to remove any build-up residue from the filtration media. Specifically, in a preferred embodiment wherein lava rock is utilized in the main filtration media, it may become necessary to clean the lava rock to remove any residual build-up from the many pores contained therein so as to maintain the efficiency that the porous lava rock aids condensation because of its great surface area. To accomplish this, a preferred embodiment of the instant invention utilizes a self-cleansing acid ring 130A–F within the main filtration tanks 104A–F. During a cleansing process, an acid based material may be sprayed over the filtration media and allowed to flow down through the media to dissolve away any of the residue which may have built up thereon. However, it is not contemplated that this process will be required very often as the continual condensation promoted therein will wash off the media as it precipitates therethrough. The acid based material will be neutralized by the water within the system.

Figure 5:
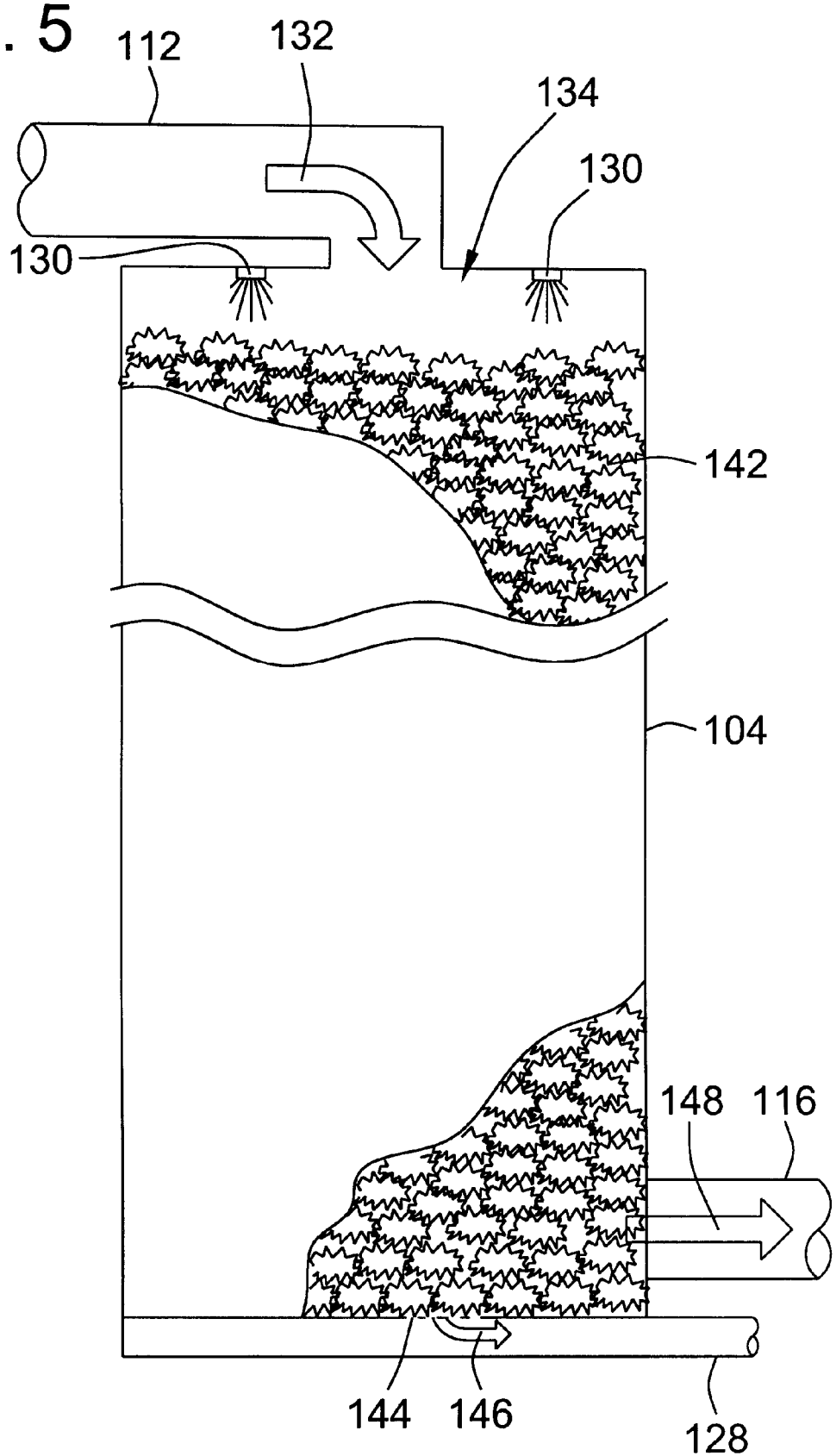
FIG. 5 is a simplified cutaway diagram illustrating certain aspects of the instant invention.

FIG. 5 illustrates a simplified internal construction of the main filter tanks 104, a simplified description of the construction of the main mixing tank 64 having previously been given with reference to FIG. 2. The main filtration tank 104 inputs the incineration exhaust and smoke through conduit 112 as illustration by directional arrow 132. The smoke and exhaust from the incineration process which enters the main filtration tank 104 from the top enters a manifold area 134.

As the smoke, exhaust and water vapor enters the manifold 134, it flows down through the filter media 142 to the bottom of filter tank 104. During this flow process, a significant portion of the smoke/water vapor mixture has condensed in the filter media 142 and has precipitated to the bottom of tank 104 in liquid form. This liquid drains through a port 144 in the bottom of tank 104 to be returned via conduit 128 to the vaporizing units illustrated and described in FIG. 4. This liquid flow is illustrated by arrow 146. The non-condensed smoke/water mixture exits the filter tank 104 to be delivered to the next filter tank in the filtration system via conduit 116 as illustrated by arrow 148.

Figure 6:
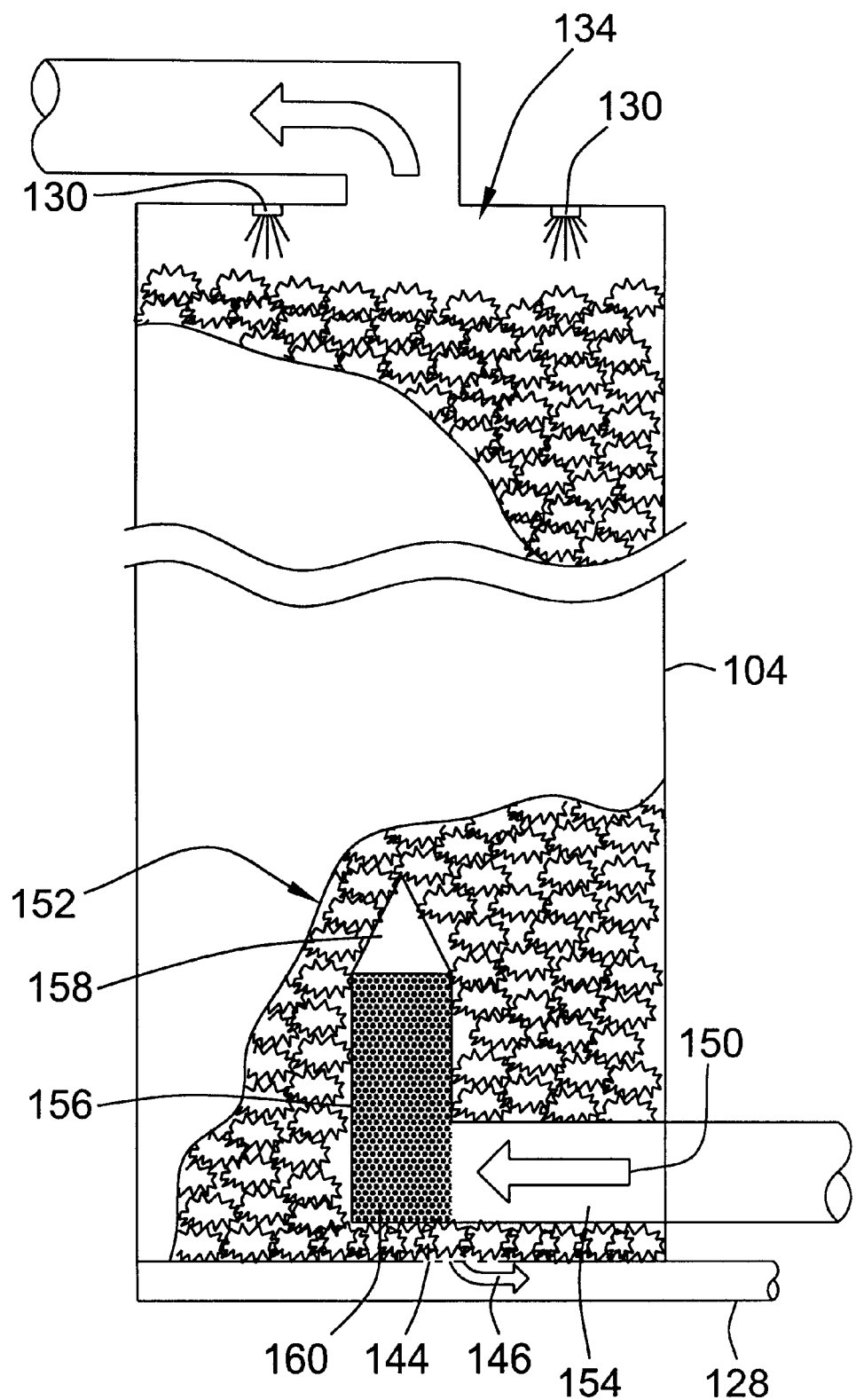
FIG. 6 is a simplified cutaway diagram illustrating certain aspects of the instant invention.

Turning now to FIG. 6, a simplified internal construction of a main filter tank 104 having the smoke/water exhaust mixture entering from the bottom and exiting from the top is illustrated. As is apparent, the construction of this filter tank 104 differs only slightly from that illustrated in FIG. 5, and hence like numerals are utilized to designate like elements of this filter tank 104. Unlike the filter tank of FIG. 5, the main filter tank 104 which introduces the smoke/water vapor mixture from the bottom as illustrated by directional arrow 150 includes a conduit structure 152 which includes a horizontal segment 154, a vertical segment 156, and a conical cap 158. To allow for the smoke/water vapor mixture to enter the main body of filter tank 104, the vertical section 156 includes a plurality of ports 160 provided therein. The number, size, and placement of these ports 160 may vary significantly from that illustrated in FIG. 6, so long as significant restriction of the gaseous flow therethrough is not inhibited significantly. The placement of this horizontal section 156 allows for introduction of the smoke/water vapor mixture into the filter media to enhance and promote the condensation of this mixture therein. Other structures may be employed for this purpose, including, e.g., the provision of a manifold at the bottom of filter tank 104 which may be formed simply by the provision of a mesh screen prohibiting the lava rock from reaching the bottom, or more complexly as may be desired. The conical shaped cap 158 of the structure illustrated in FIG. 6 both forces the smoke/water vapor mixture to exit the plurality of ports 160 in vertical section 156, as well as directing the precipitated mixture away from this vertical section 156.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A refuse incineration plant, comprising:
   at least one burn core having a fore and an aft door, said burn core suitable for incineration of refuse;
   a rail system providing a track through said burn core and connecting said burn core with a refuse loading area and an ash removal area within the plant;
   at least one burn tray movably positioned on said rail system, said burn tray adapted to carry refuse from the refuse loading area, through said burn core, and to the ash removal area on said rail system;
   an incineration exhaust filtration system having a main mixing tank and a plurality of filter condenser tanks in serial ascending/descending gaseous communication; and
   a burn cycle controller, at least two burn cores, and a steam turbine electrical power generation sub-system having a main steam tank positioned in thermal association with said at least two burn cores, and wherein a burn cycle in one of said at least two burn cores is not begun and ended simultaneously with a burn cycle in another of said at least two burn cores.

2. A refuse incineration plant, comprising:
   at least one burn core having a fore and an aft door, said burn core suitable for incineration of refuse;
   a rail system providing a track through said burn core and connecting said burn core with a refuse loading area and an ash removal area within the plant;
   at least one burn tray movably positioned on said rail system, said burn tray adapted to carry refuse from the refuse loading area, through said burn core, and to the ash removal area on said rail system;
   an incineration exhaust filtration system having a main mixing tank and a plurality of filter condenser tanks in serial ascending/descending gaseous communication;
   an incineration exhaust sensor, said exhaust sensor positioned to sense exhaust resulting from operation of said burn core;
   a burn cycle controller in sensory communication with said exhaust sensor;
   wherein said burn cycle controller varies a period of operation of said burn core based on input from said exhaust sensor; and
   wherein said exhaust sensor is a light wave type sensor providing an output signal indicative of the amount of particulate matter in the exhaust, and wherein said burn cycle controller continues operation of said burn core until said output signal drops to a preset level, said preset level corresponding to essentially complete incineration of refuse within said burn core.

3. A refuse incineration plant, comprising:
   at least one burn core having a fore and an aft door, said burn core suitable for incineration of refuse;
   a rail system providing a track through said burn core and connecting said burn core with a refuse loading area and an ash removal area within the plant;
   at least one burn tray movably positioned on said rail system, said burn tray adapted to carry refuse from the refuse loading area, through said burn core, and to the ash removal area on said rail system;
   an incineration exhaust filtration system having a main mixing tank and a plurality of filter condenser tanks in serial ascending/descending gaseous communication;
   a cooling unit; and
   wherein said main mixing tank comprises:
     a vertical housing having an incineration exhaust entry port and a cold air entry port near a bottom thereof and an incineration exhaust exit port at a top thereof, said incineration exhaust entry port in gaseous communication with said burn core, and said cold air entry port in gaseous communication with said cooling unit;

a plurality of baffle plates positioned within said vertical housing along a height of said main mixing tank; and a plurality of water vapor spray jets positioned around an inner periphery of said vertical housing.

4. A refuse incineration plant, comprising:

at least one burn core having a fore and an aft door, said burn core suitable for incineration of refuse;

a rail system providing a track through said burn core and connecting said burn core with a refuse loading area and an ash removal area within the plant;

at least one burn tray movably positioned on said rail system, said burn tray adapted to carry refuse from the refuse loading area, through said burn core, and to the ash removal area on said rail system;

an incineration exhaust filtration system having a main mixing tank and a plurality of filter condenser tanks in serial ascending/descending gaseous communication; and wherein said filter condenser tanks comprise:

a vertical housing having a first exhaust port at a top thereof and a second exhaust port near a bottom thereof; and condensation and filtration media disposed within said vertical housing to a point forming a manifold area between an upper most surface of said media and a bottom surface of said top of said vertical housing.

5. The plant of claim 4, wherein said media is lava rock.

6. A refuse incineration plant, comprising:

at least one burn core having a fore and an aft door, said burn core suitable for incineration of refuse;

a rail system providing a track through said burn core and connecting said burn core with a refuse loading area and an ash removal area within the plant;

at least one burn tray movably positioned on said rail system, said burn tray adapted to carry refuse from the refuse loading area, through said burn core, and to the ash removal area on said rail system;

an incineration exhaust filtration system having a main mixing tank and a plurality of filter condenser tanks in serial ascending/descending gaseous communication; and wherein said filtration system utilizes a plurality of water vapor spray jets within said main mixing tank, the plant further comprising:

a water vaporization system including at least one vaporizer, first fluid communication means coupled between said vaporizer and said plurality of water vapor spray jets, and second fluid communication means coupled between said main mixing tank and said filter condenser tanks to said vaporizer; and wherein said vaporizer vaporizes fluid delivered to it from said main mixing tank and said filter condenser tanks, collecting residue thereon from said main mixing tank and said filter condenser tanks for later removal and disposal.

7. In an incineration plant adapted to incinerate refuse, the incineration plant including at least one burn core in which refuse is incinerated thereby generating smoke and exhaust, an incineration exhaust filtration system, comprising:

a vertical mixing tank having an exhaust inlet port near a bottom thereof for receiving smoke and exhaust from the incineration plant, and an exhaust outlet port at a top thereof, said mixing tank including a plurality of baffle plates axially displaced one from another within said mixing tank, and a plurality of water vapor spray jets disposed around an inner periphery of said mixing tank;

a plurality of vertical filter condenser tanks coupled to said exhaust outlet port of said mixing tank in series descending/ascending gaseous communication, said filter condenser tanks forming an exhaust path of alternating descending and ascending gaseous flow through adjacent series coupled filter condenser tanks; and at least one cooling coil in thermal communication with said gaseous flow, said at least one cooling coil aiding condensation of said descending and ascending gaseous flow.

8. In an incineration plant adapted to incinerate refuse, the incineration plant including at least one burn core in which refuse is incinerated thereby generating smoke and exhaust, an incineration exhaust filtration system, comprising:

a vertical mixing tank having an exhaust inlet port near a bottom thereof for receiving smoke and exhaust from the incineration plant, and an exhaust outlet port at a top thereof, said mixing tank including a plurality of baffle plates axially displaced one from another within said mixing tank, and a plurality of water vapor spray jets disposed around an inner periphery of said mixing tank;

a plurality of vertical filter condenser tanks coupled to said exhaust outlet port of said mixing tank in series descending/ascending gaseous communication, said filter condenser tanks forming an exhaust path of alternating descending and ascending gaseous flow through adjacent series coupled filter condenser tanks; and wherein said filter condenser tanks include a condensation media disposed therein, said filter condenser tanks forming a manifold between an inner top surface of said filter condenser tanks and an upper surface of said condensation media.

9. The system of claim 8, wherein said filter condenser tanks include an acid ring positioned within said manifold.

10. The system of claim 8, wherein said mixing tank and said filter condenser tanks include a condensed fluid drainage port, the system further comprising at least one vaporizer, said vaporizer receiving condensed fluid from said drainage ports from said mixing tank and from each of said filter condenser tanks, and wherein said vaporizer vaporizes water out of said condensed fluid thereby collecting residue therefrom.

11. The system of claim 10, wherein said residue is periodically removed from said vaporizer.

12. In an incineration plant adapted to incinerate refuse, the incineration plant including at least one burn core in which refuse is incinerated thereby generating smoke and exhaust, an incineration exhaust filtration system, comprising:

a vertical mixing tank having an exhaust inlet port near a bottom thereof for receiving smoke and exhaust from the incineration plant, and an exhaust outlet port at a top thereof, said mixing tank including a plurality of baffle plates axially displaced one from another within said mixing tank, and a plurality of water vapor spray jets disposed around an inner periphery of said mixing tank;

a plurality of vertical filter condenser tanks coupled to said exhaust outlet port of said mixing tank in series descending/ascending gaseous communication, said filter condenser tanks forming an exhaust path of alternating descending and ascending gaseous flow through adjacent series coupled filter condenser tanks; and wherein said filter condenser tanks having ascending gaseous flow further comprises a structure having a horizontal conduit forming a part of said exhaust path along a bottom of said filter condenser tanks, and a vertical conduit in gaseous communication with said horizontal conduit, said vertical conduit define a plurality of gas exit ports therein.

13. In an incineration plant adapted to incinerate refuse, the incineration plant including at least one burn core in which refuse is incinerated thereby generating smoke and exhaust, an incineration exhaust filtration system, comprising:

a vertical mixing tank having an exhaust inlet port near a bottom thereof for receiving smoke and exhaust from the incineration plant, and an exhaust outlet port at a top thereof, said mixing tank including a plurality of baffle plates axially displaced one from another within said mixing tank, and a plurality of water vapor spray jets disposed around an inner periphery of said mixing tank;

a plurality of vertical filter condenser tanks coupled to said exhaust outlet port of said mixing tank in series descending/ascending gaseous communication, said filter condenser tanks forming an exhaust path of alternating descending and ascending gaseous flow through adjacent series coupled filter condenser tanks;

a secondary vertical filter condenser tank in series descending gaseous communication with said filter condenser tanks; and a vertical filter and testing tank in series ascending gaseous communication with said secondary filter condenser tank.

* * * * *